United States Patent Office 2,937,188
Patented May 17, 1960

2,937,188

2-METHYL 2,3-DIHYDROBENZOFURANCARBOXYLIC ACIDS AND ACID HALIDES

Milton Louis Hoefle and Robert Walter Wynn, Easton, Pa., assignors to General Aniline & Film Corporation, New York, N.Y., a corporation of Delaware No Drawing. Application November 15, 1951
Serial No. 256,621

The terminal portion of the term of the patent subsequent to April 6, 1971, has been disclaimed 5 Claims. (Cl. 260—346.2)

This invention relates to novel 2-lower alkyl-2,3-dihydrobenzofurancarboxylic acids and their acid halides which may be represented by the following general formula:

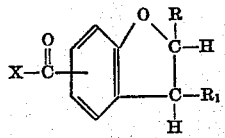

wherein X=halogen or OH; R=lower alkyl usually methyl and $R_1$=hydrogen or lower alkyl usually methyl.

We have found that the 2-lower alkyl-2,3-dihydrobenzofurancarboxylic acids, which may be obtained from methyl allyl hydroxybenzoates by treatment with hydrobromic acid, are valuable intermediates for the production of fluorescent brightening agents by condensation of the acid halide thereof with 4,4'-diamino-2,2'-stilbenedisulfonic acid.

The details of the present invention may most readily be described by consideration of the following specific examples thereof.

Example 1

50 grams of methyl 3-allyl-2-hydroxybenzoate, prepared in the manner described by Claisen Ber. 45, 3157 (1912), was added to 200 cc. of glacial acetic acid containing 73 cc. of hydrobromic acid (48 percent). The solution was heated on a steam cone for 14 hours and then cooled and poured into a 2-liter beaker containing crushed ice. The organic material was extracted with ether. The ether was removed by distillation and the residue was heated with 200 cc. of 10% sodium hydroxide solution until all had gone into solution. The thus obtained solution was then cooled and acidified with concentrated hydrochloric acid. The resultant oil was separated and 20 cc. of glacial acetic acid was added thereto. On standing, the oil crystallized and the crystalline material was filtered off and recrystallized from methanol, yielding 22 grams of product 2-methyl-2,3-dihydrobenzofuran-7-carboxylic acid (melting point 120–123° C.).

The thus obtained 2-methyl-2,3-dihydrobenzofuran-7-carboxylic acid was then converted to the acid chloride by treating the same with three times its weight of thionyl chloride while stirring at reflux for 12 hours. The excess thionyl chloride was then removed by distillation and the residue distilled under vacuum. 2-methyl-2,3-dihydrobenzofuran-7-carboxylic acid chloride was obtained in good yield (boiling point 125–127° C./5 mm.). This product had the formula

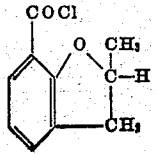

Example 2

The procedure of Example 1 was followed except that in place of methyl-3-allyl-2-hydroxybenzoate there was used an equivalent amount of methyl-3-methallyl-2-hydroxybenzoate (prepared by the procedure described by Claisen Ber. 45, 3157 (1912)) except that an equivalent amount of methallyl chloride was used in place of the allyl bromide employed by Claisen. There was obtained 2,3-dimethyl-2,3-dihydrobenzofuran-7-carboxylic acid chloride having the following formula:

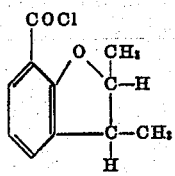

Example 3

A 1-liter-3-necked flask equipped with an efficient stirrer and reflux condenser was charged with 190.5 grams methyl p-hydroxybenzoate, 105 grams of allyl chloride, 190 grams potassium carbonate, 250 cc. acetone and 50 grams sodium iodide. The reaction mixture was refluxed for 24 hours and then diluted with 500 cc. of water. The organic layer was separated and distilled under vacuum, yielding 207 grams of methyl p-allyloxybenzoate (boiling point 115–118° C./4 mm.).

155 grams of the thus obtained methyl p-allyloxybenzoate was charged into a 500 cc. flask and heated under an atmosphere of nitrogen. When the temperature reached 255° C. the flame was removed and the temperature rapidly rose to 310° C. The product solidified on cooling, yielding 153 grams methyl 4-hydroxy-3-allylbenzoate (melting point 87–90° C.).

A 500 cc. round bottom flask was charged with 50 grams of the thus obtained methyl 3-allyl-4-hydroxybenzoate, 75 cc. of 48% hydrobromic acid and 220 cc. of glacial acetic acid. This solution was warmed on a steam cone for 16 hours and then added to 1600 grams of cracked ice. The oil which separated was saponified and then crystallized from aqueous methanol, yielding 19.5 grams 2-methyl-2,3-dihydrobenzofuran-5-carboxylic acid. This material was treated with 50 cc. of thionyl chloride, the product distilled under vacuum, yielding 14 grams 2-methyl-2,3-dihydro-5-benzofurancarbonyl chloride (boiling point 114–116° C./3 mm.) having the formula:

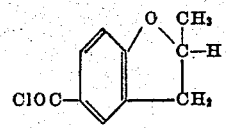

Samples of each of the acid chlorides produced as described in Examples 1, 2, and 3 were condensed with 4,4'-diamino-2,2'-stilbenedisulfonic acid to produce fluorescent agents as described in our copending application Serial No. 256,622, now U.S. Patent 2,674,604 which were of value as fluorescent brightening agents for textiles.

We claim:
1. Compounds of the formula:

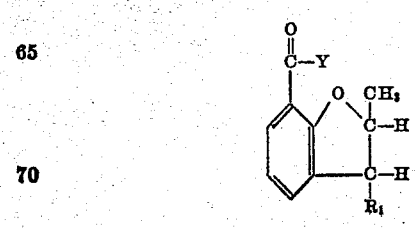

wherein Y represents a member of the group consisting of halogen and OH; and $R_1$ represents a member of the group consisting of hydrogen and methyl.

2. 2 - methyl - 2,3 - dihydrobenzofuran - 7 - carboxylic acid.

3. 2 - methyl - 2,3 - dihydrobenzofuran - 7 - carboxylic acid chloride.

4. 2,3 - dimethyl - 2,3 - dihydrobenzofuran - 7 - carboxylic acid.

5. 2,3 - dimethyl - 2,3 - dihydrobenzofuran - 7 - carboxylic acid chloride.

References Cited in the file of this patent

UNITED STATES PATENTS

| | | |
|---|---|---|
| 2,563,493 | Scalera | Aug. 7, 1951 |
| 2,563,795 | Scalera | Aug. 7, 1951 |
| 2,573,652 | Scalera | Oct. 30, 1951 |
| 2,584,664 | Blomquist | Feb. 15, 1952 |
| 2,674,604 | Hoefle et al. | Apr. 6, 1954 |

FOREIGN PATENTS

| | | |
|---|---|---|
| 279,864 | Germany | Oct. 29, 1914 |

OTHER REFERENCES

Traynham: J. Sci. Labs. 42, Art. 4/5, pp. 60–63 (received March 1951), (Denison Univ. Bull. 51, No. 1).

Lauer et al.: J. Am. Chem. Soc., vol. 65, pp. 289–293.

Lauer et al.: J. Am. Chem. Soc., vol. 65, pp. 198–201 (1943).